(12) United States Patent
Lane

(10) Patent No.: US 8,413,345 B2
(45) Date of Patent: Apr. 9, 2013

(54) VISION SYSTEM

(76) Inventor: Troy R. Lane, Dover, NJ (US)

(*) Notice: Subject to any disclaimer, the term of this patent is extended or adjusted under 35 U.S.C. 154(b) by 292 days.

(21) Appl. No.: 12/696,243

(22) Filed: Jan. 29, 2010

(65) Prior Publication Data

US 2011/0185586 A1  Aug. 4, 2011

(51) Int. Cl.
*G01B 3/00* (2006.01)

(52) U.S. Cl.
USPC .................................. 33/501; 33/574; 33/577

(58) Field of Classification Search .................... 33/501, 33/613, 626, 644, 645, 549, 577, 574
See application file for complete search history.

(56) References Cited

U.S. PATENT DOCUMENTS

| | | | | |
|---|---|---|---|---|
| 2,246,088 A * | 6/1941 | Clementz | ......................... | 33/454 |
| 2,954,609 A * | 10/1960 | Goertz | ............................. | 33/443 |
| 5,024,002 A * | 6/1991 | Possati | ............................. | 33/549 |
| 5,205,045 A * | 4/1993 | Liu | ................................. | 33/468 |
| 5,463,818 A * | 11/1995 | Hughes | ........................... | 33/813 |
| 5,522,145 A * | 6/1996 | Chisum | ............................ | 33/288 |
| 5,657,548 A * | 8/1997 | Kellar, Sr. | ........................ | 33/405 |
| 6,158,137 A * | 12/2000 | Bramlett | ......................... | 33/520 |
| 6,421,928 B1 * | 7/2002 | Miller | ................................ | 33/520 |
| 6,823,600 B1 * | 11/2004 | Vaughan | .......................... | 33/288 |
| 6,880,258 B2 * | 4/2005 | Adams et al. | .................... | 33/371 |
| 7,082,694 B2 * | 8/2006 | Lyman, Jr. | ........................ | 33/670 |
| 7,152,331 B2 * | 12/2006 | Nakamura et al. | ............. | 33/1 M |
| 7,155,840 B1 * | 1/2007 | Carbonaro | ....................... | 33/613 |
| 7,219,437 B2 * | 5/2007 | Dallman | ......................... | 33/286 |
| 7,941,935 B2 * | 5/2011 | Khan | ................................ | 33/645 |
| 7,997,312 B2 * | 8/2011 | Van Valkenburg | .............. | 33/638 |
| 2011/0185586 A1 * | 8/2011 | Lane | ................................ | 33/501 |
| 2012/0000083 A1 * | 1/2012 | Tarizzo | ............................ | 33/503 |

* cited by examiner

*Primary Examiner* — Yaritza Guadalupe-McCall
(74) *Attorney, Agent, or Firm* — Nils H. Ljungman & Associates

(57) ABSTRACT

A vision apparatus may include a first longitudinal base member, a second longitudinal base member which substantially mirrors the first longitudinal base member, a traverse member to connect the first and second longitudinal base member, a pointer member being positioned on the traverse member. The longitudinal base member may include a inclined tower surface, and the longitudinal base member may include a mounting post. The mounting post may cooperate with a rail, and the pointer member may be detachably connected to the traverse member. The first longitudinal base member may include a tower member to cooperate with the rail member, and the vision apparatus may include a tower member to connect the longitudinal base member and the traverse member. The tower member may be detachably connected.

2 Claims, 18 Drawing Sheets

VISION SYSTEM
ASSEMBLY

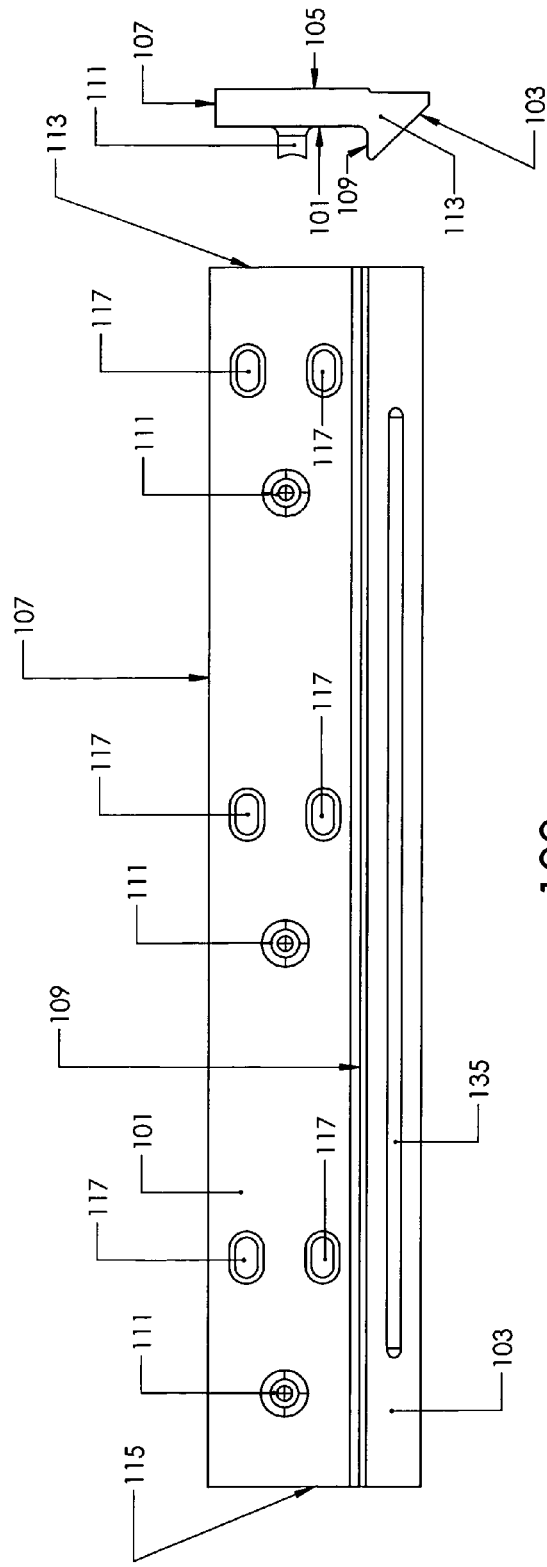

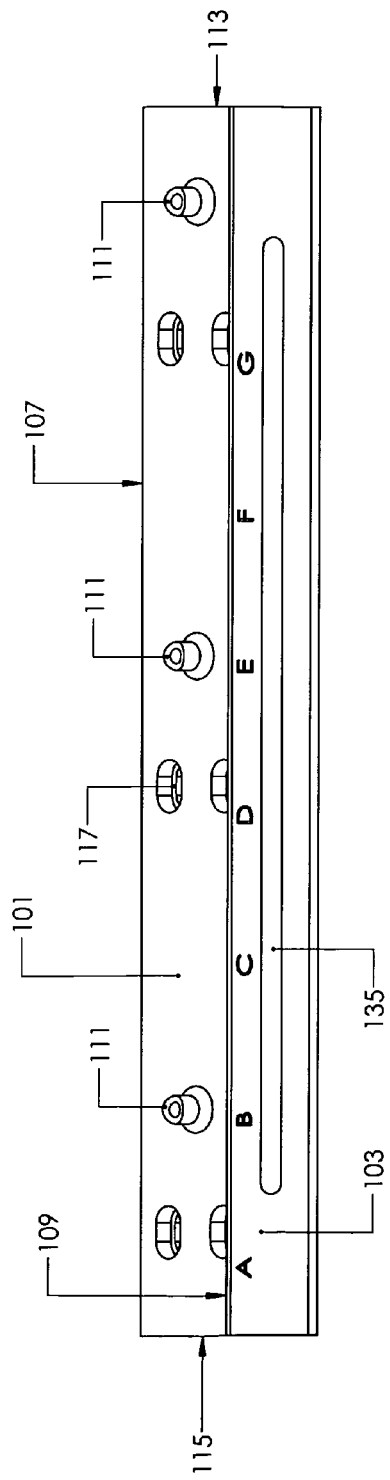

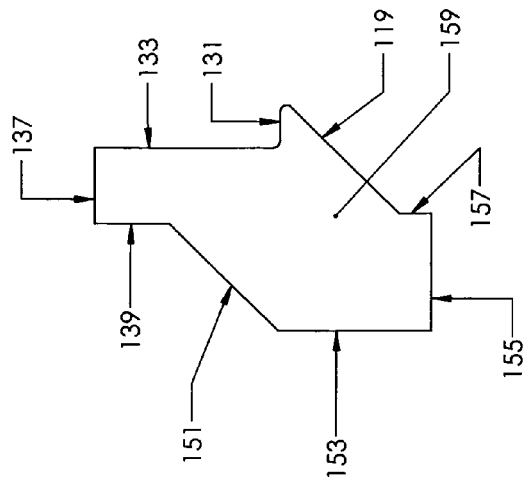
FIGURE 4
136
TOWER MEMBER
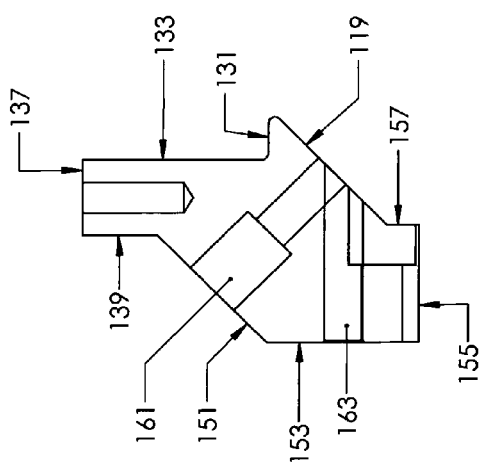
FIGURE 5
136
TOWER MEMBER
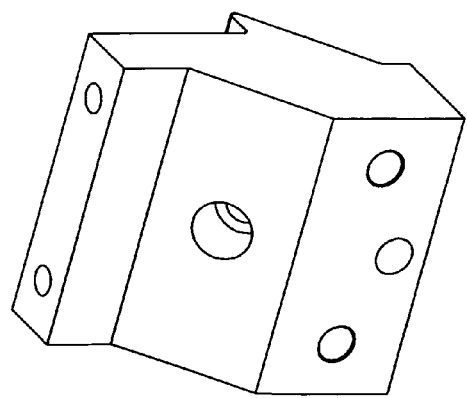

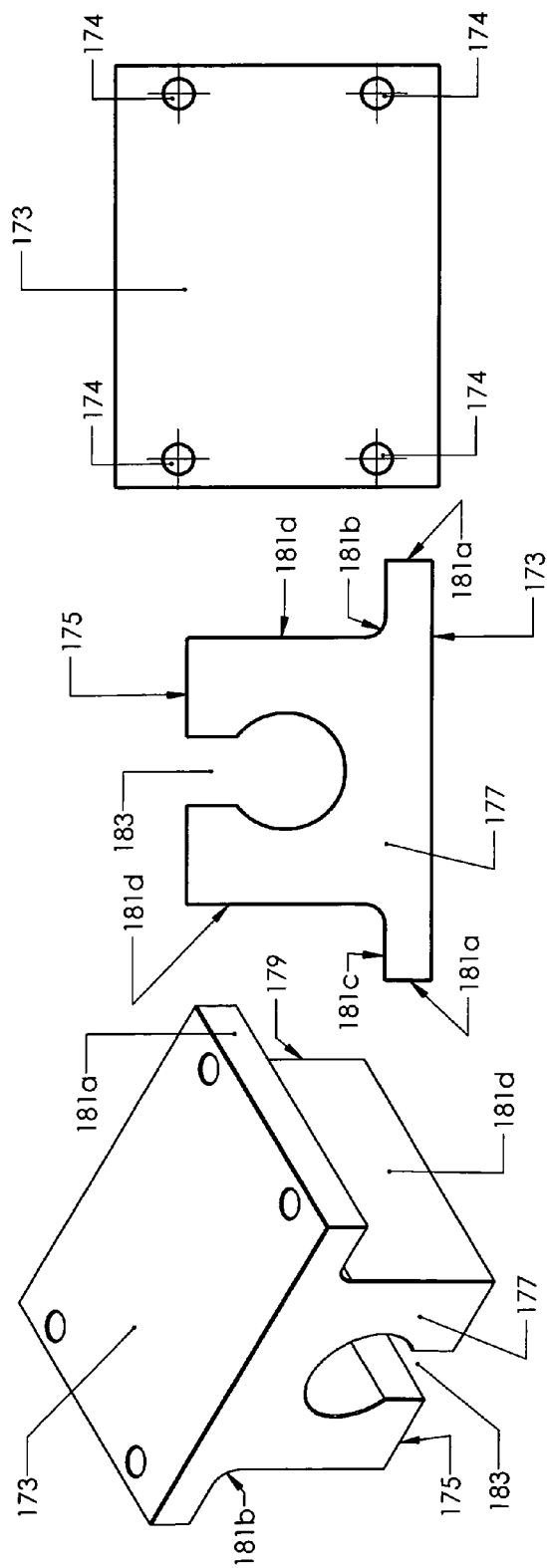

RAIL MEMBER

RAIL MEMBER

RAIL MEMBER

POINTER MEMBER
300

POINTER MEMBER
300

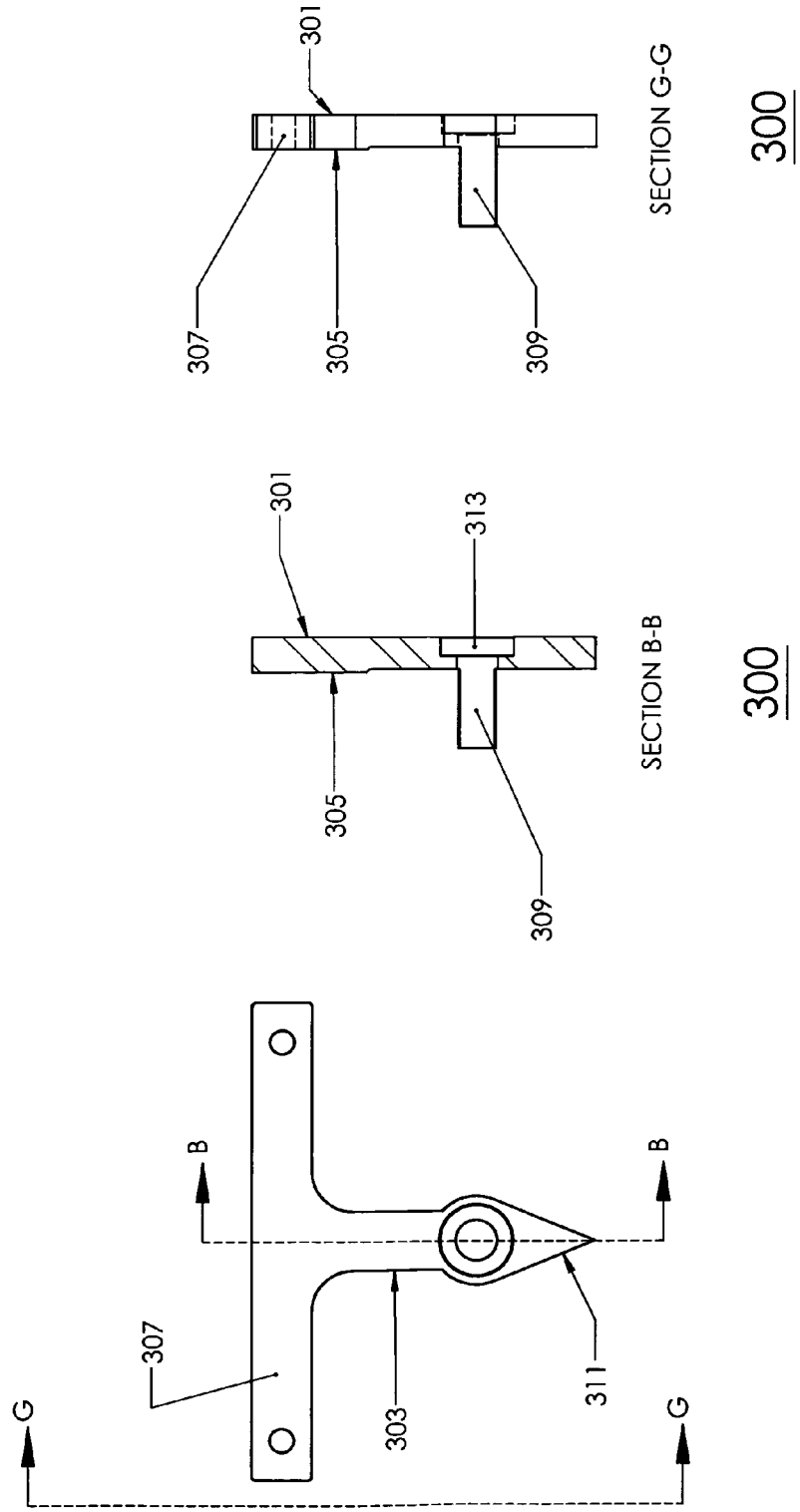

POINTER MEMBER

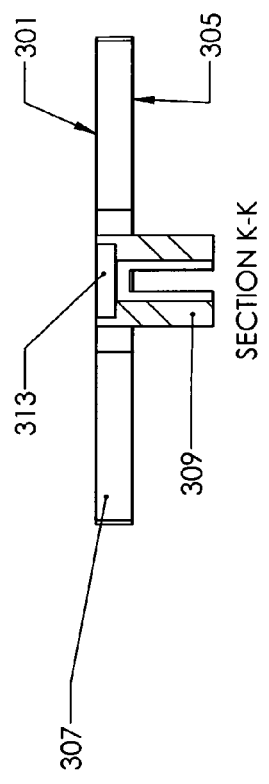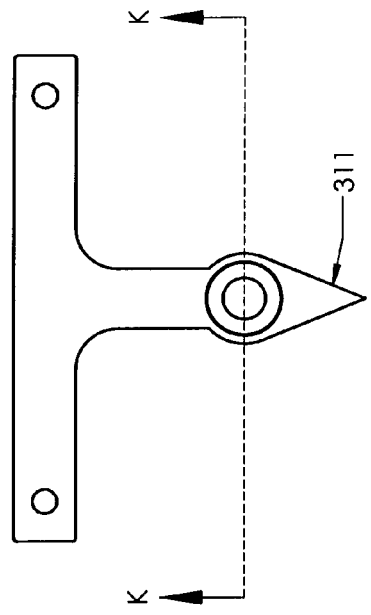
300
FIGURE 17
POINTER MEMBER

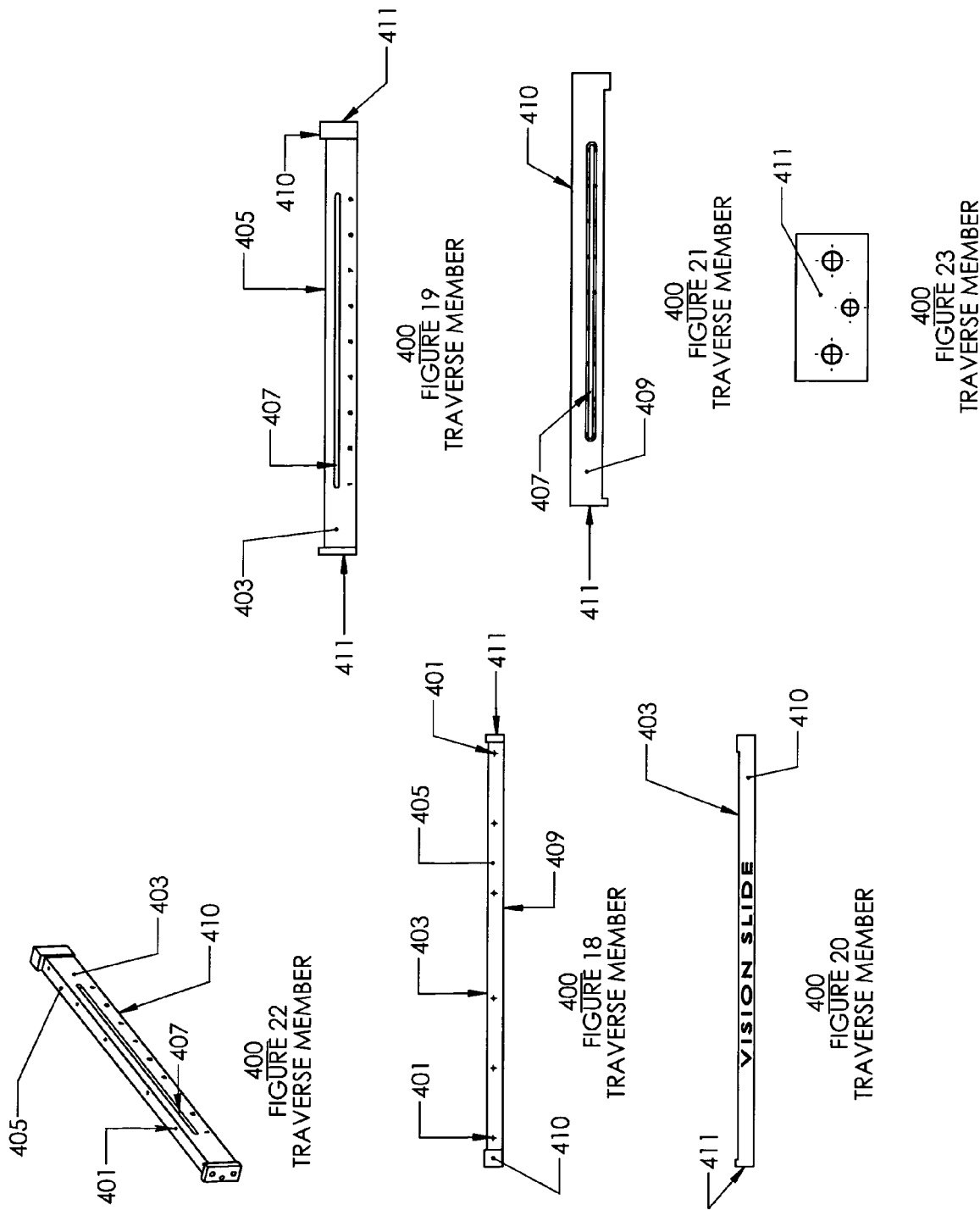

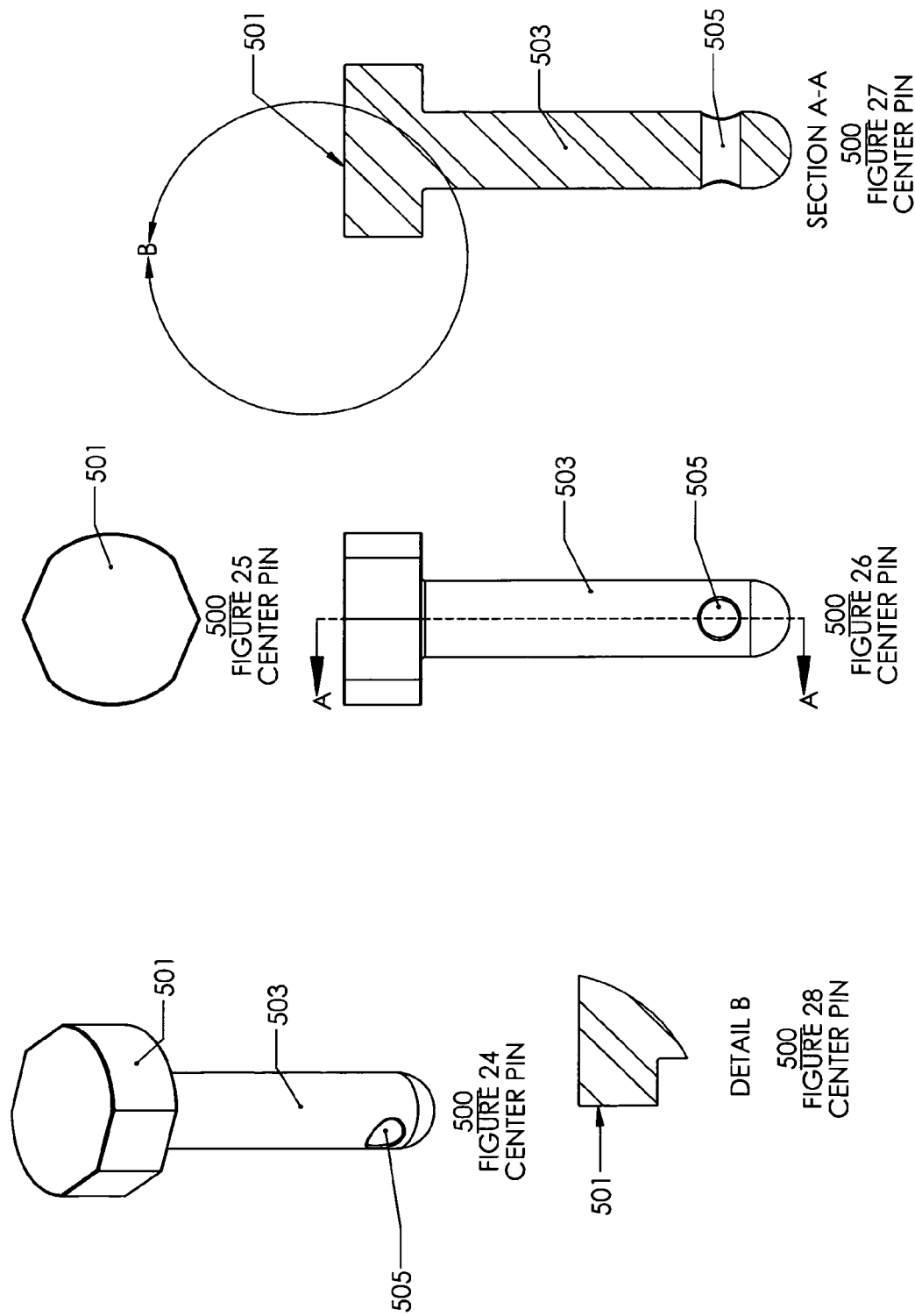

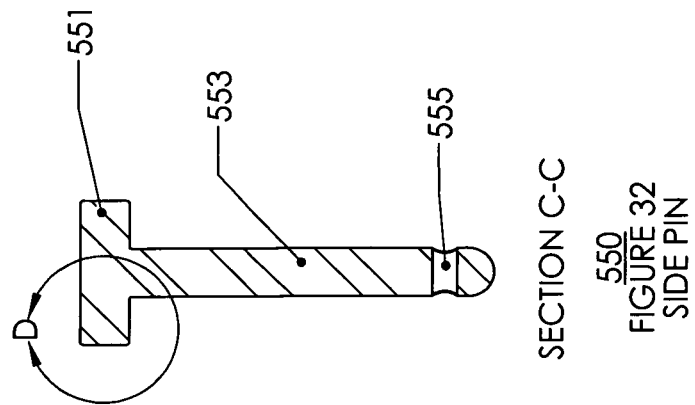
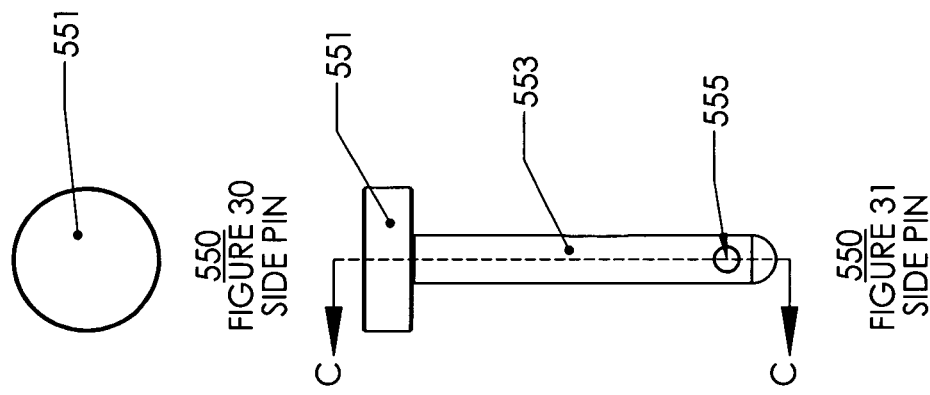
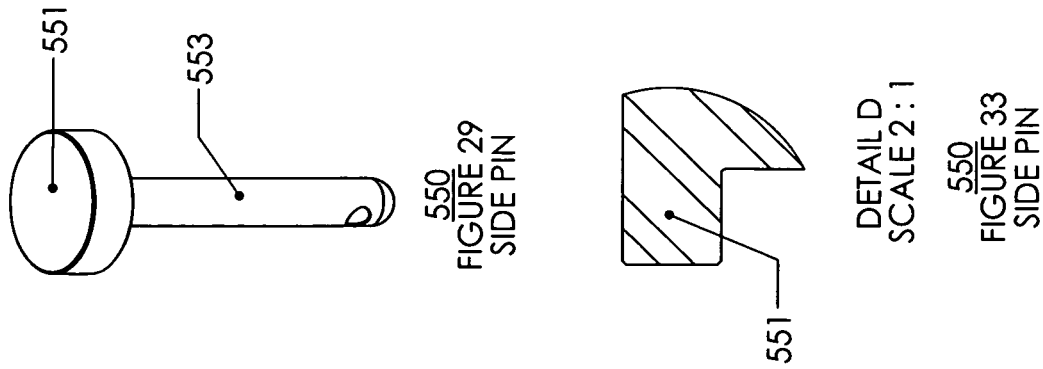

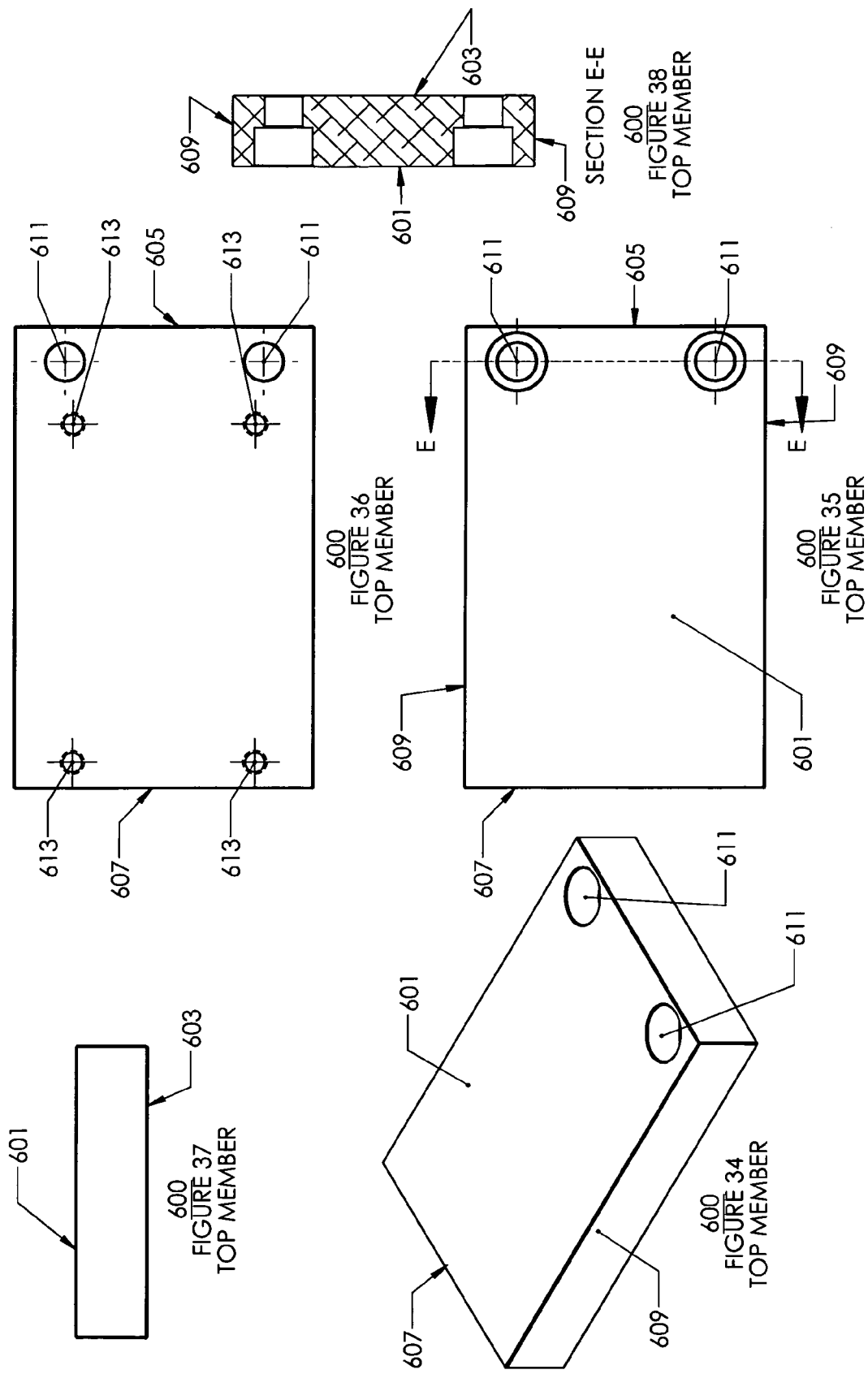

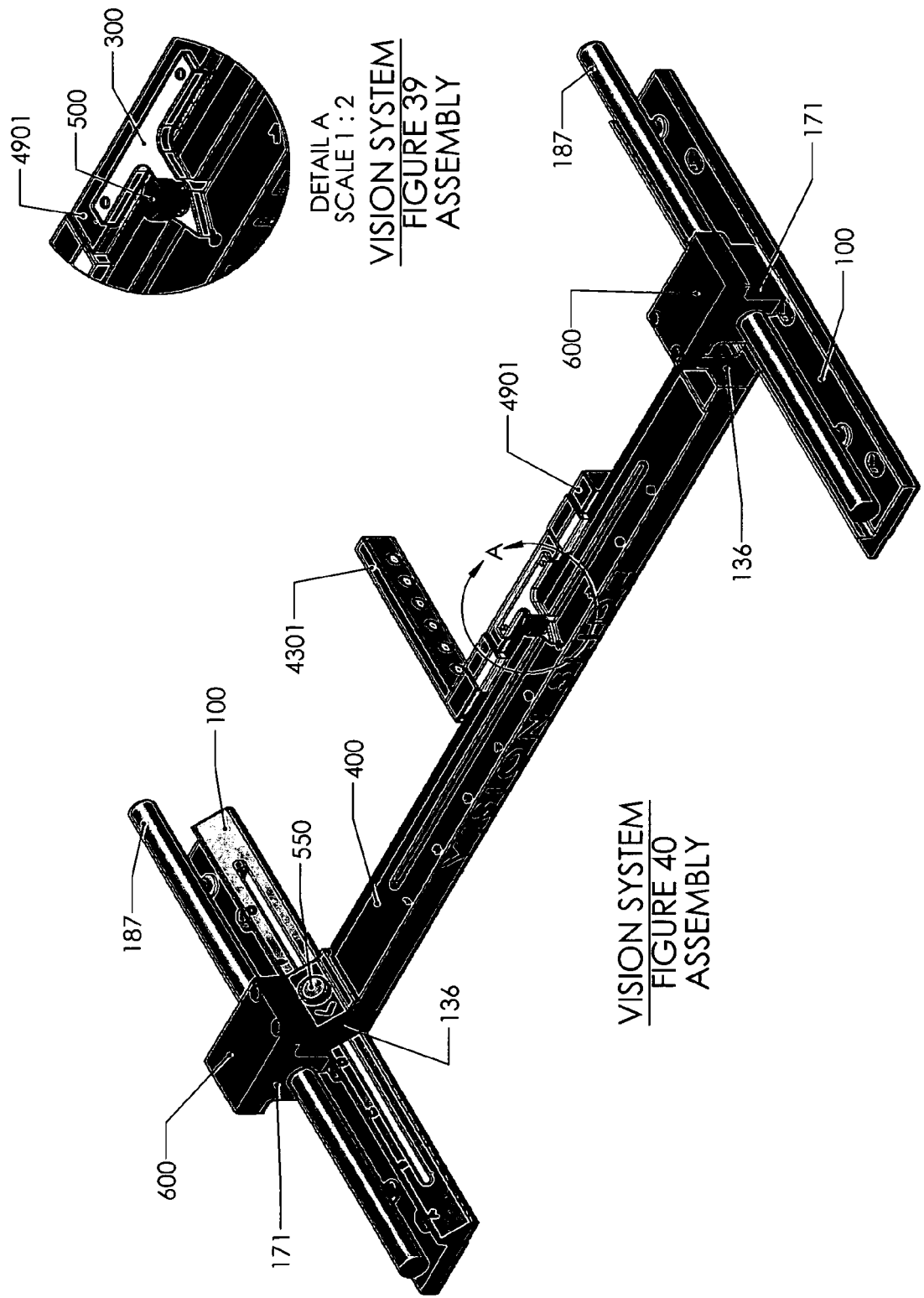

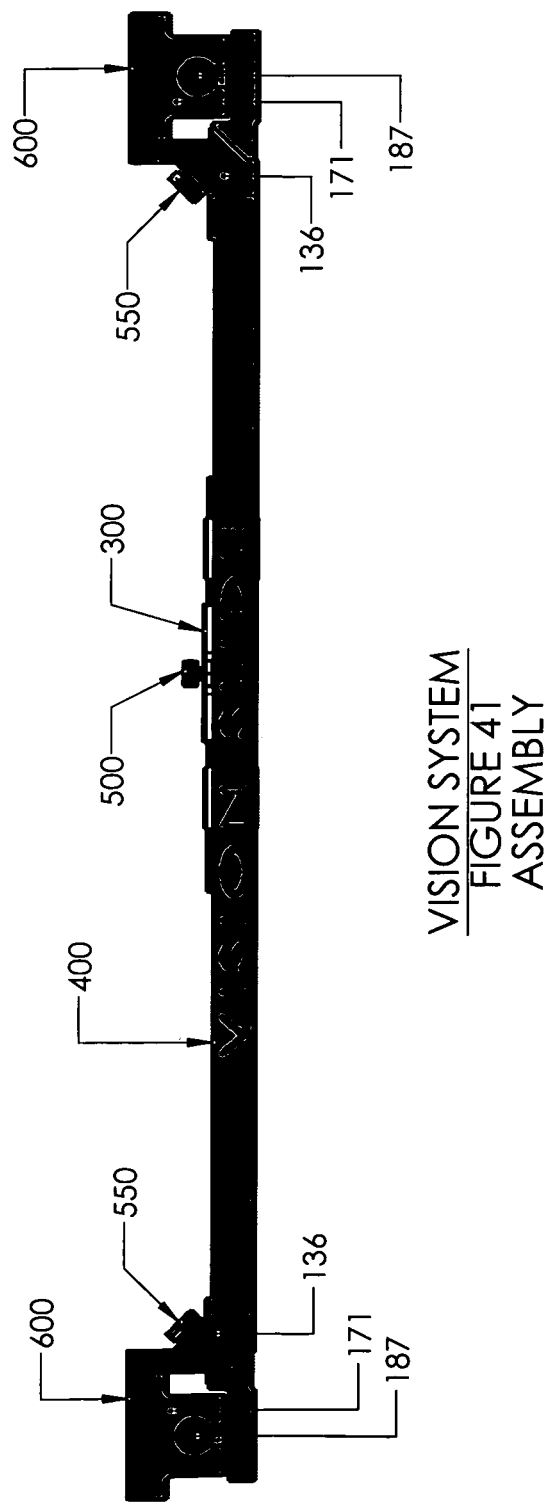

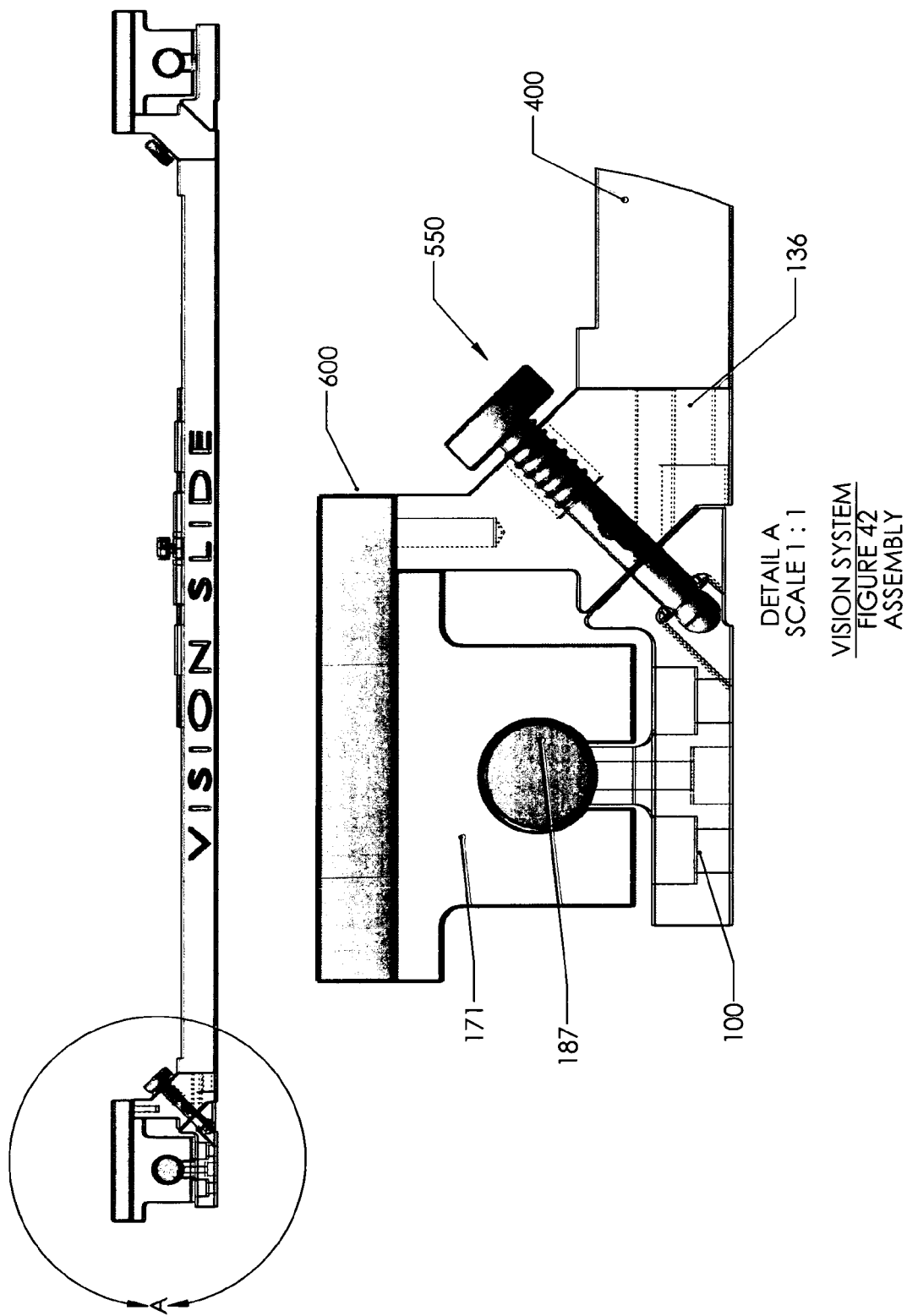

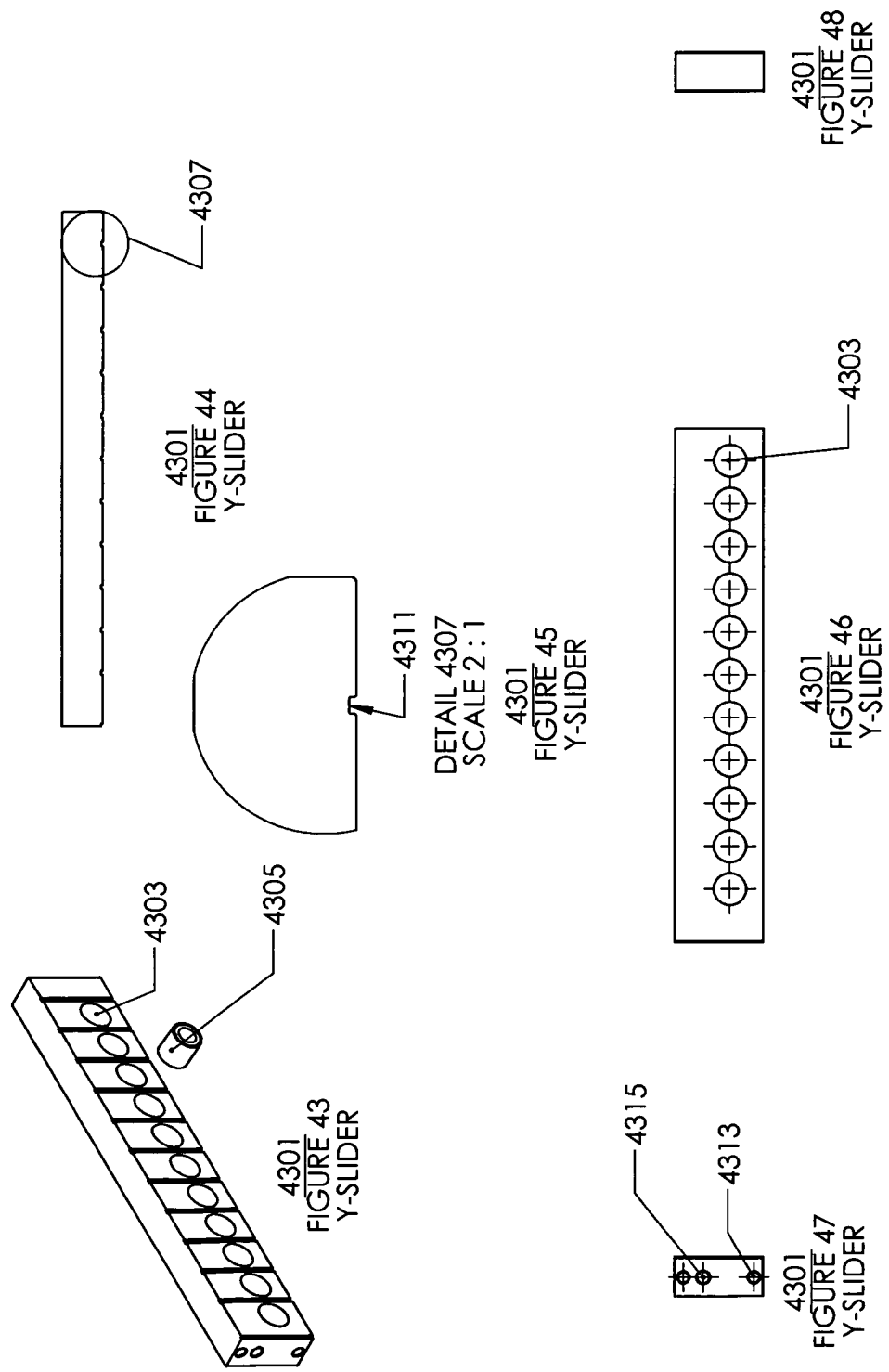

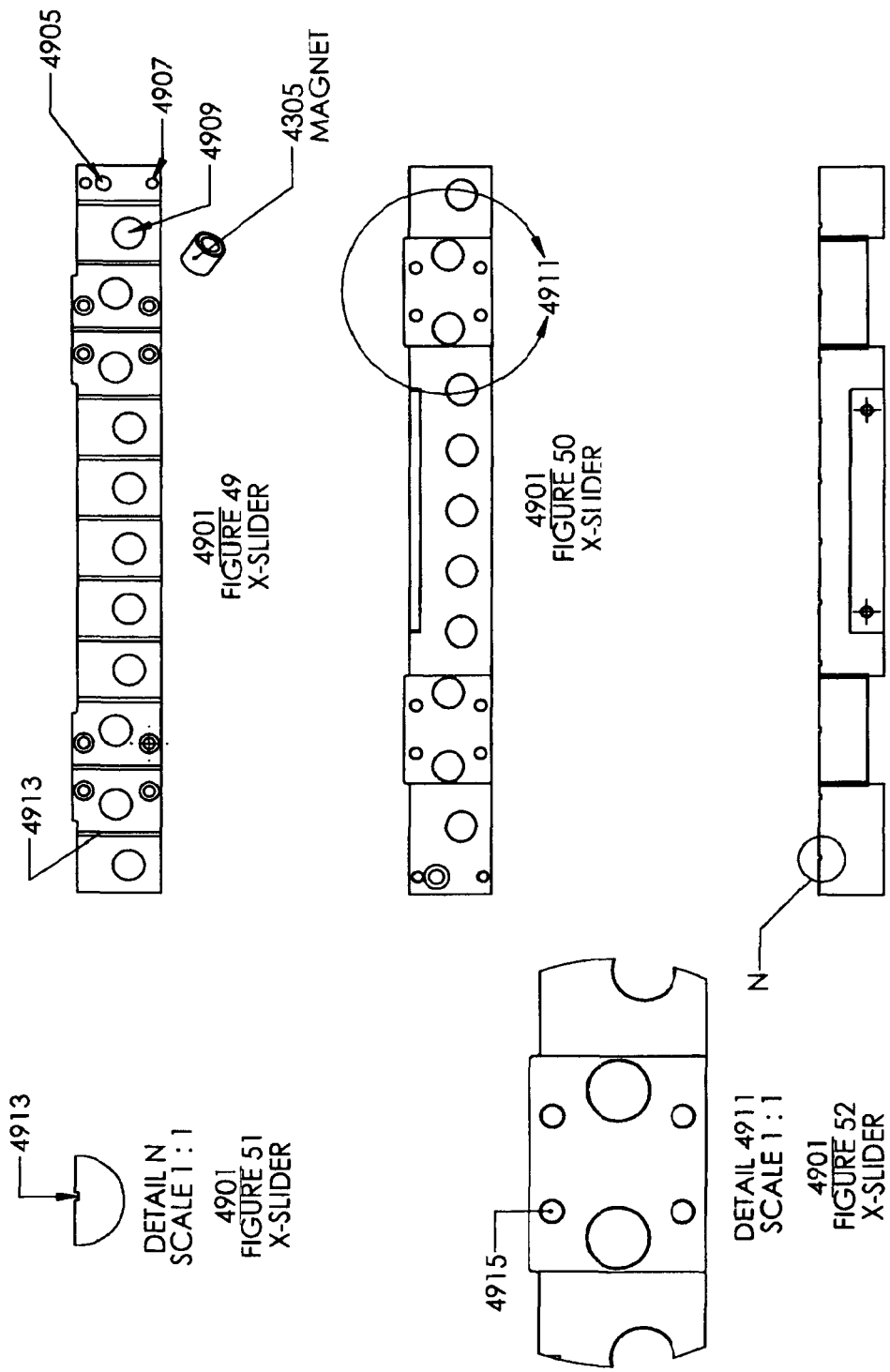

VISION SYSTEM

FIELD OF THE INVENTION

The present invention relates to automatic dimensional measurement machines and more particularly to a vision system which accurately secures a work piece for the automatic dimensional measurement machine.

BACKGROUND

Currently, the operator of an automatic dimensional measurement machine places a part on the table for measurement using clay or another means of holding the part down as to stop the part from moving and when necessary put the next part on the CMM in the same spot to ensure reliability and repeatability of the program written to inspect the part or for checking the capability of a machining process or for checking the repeatability of the machine itself.

SUMMARY

A vision apparatus may include a first longitudinal base member, a second longitudinal base member which substantially mirrors the first longitudinal base member, a traverse member to connect the first and second longitudinal base member, a pointer member being positioned on the traverse member.

The longitudinal base member may include a inclined tower surface, and the longitudinal base member may include a mounting post.

The mounting post may cooperate with a rail, and the pointer member may be detachably connected to the traverse member.

The first longitudinal base member may include a tower member to cooperate with the rail member, and the vision apparatus may include a tower member to connect the longitudinal base member and the traverse member.

The tower member may be detachably connected.

The traverse member may include an attached latitudinal/parallel slide member containing magnets or air suction or forceless material providing 1, 2 or 3 points of contact for the positioning of a fixture or part in its coincident plane, providing a stop location in its draw force or coincident locating plane.

The aforementioned latitudinal/parallel*slide member may include a longitudinal slide member containing magnets or air suction or forceless material providing 1, 2 or 3 points of contact for the positioning of a fixture or part in its coincident plane, providing a stop location in its draw force or coincident locating plane and providing either the primary, secondary or tertiary planer stop.

BRIEF DESCRIPTION OF THE DRAWINGS

The invention may be understood by reference to the following description taken in conjunction with the accompanying drawings, in which, like reference numerals identify like elements, and in which:

FIG. 1 illustrates a top view of the base member of the vision system of the present invention;

FIG. 2 illustrates a perspective view of the base member of the vision system of the present invention;

FIG. 3 illustrates a side view of the base member of the vision system of the present invention;

FIG. 4 illustrates a side view of the tower member of the vision system of the present invention;

FIG. 5 illustrates a cross-sectional view of the tower member of the vision system of the present invention;

FIG. 6 illustrates a perspective view of the slider member of the vision system of the present invention;

FIG. 7 illustrates a front view of the slider member of the vision system of the present invention;

FIG. 8 illustrates a top view of the slider member of the vision system of the present invention;

FIG. 14 illustrates a sectional view of the pointer member of the vision system of the present invention;

FIG. 15 illustrates a cross-sectional view of the pointer member of the vision system of the present invention;

FIG. 17 illustrates a cross-sectional view of the pointer member of the vision system of the present invention;

FIG. 18 illustrates a back view of the transverse member of the vision system of the present invention;

FIG. 19 illustrates the top view of the transverse member of the vision system of the present invention;

FIG. 20 illustrates a front view of the transverse member of the vision system of the present invention;

FIG. 21 illustrates a bottom view of the transverse member of the vision system of the present invention;

FIG. 22 illustrates a perspective view of the transverse member of the vision system of the present invention;

FIG. 23 illustrates an end view of the traverse member of the vision system of the present invention;

FIG. 24 illustrates a perspective view of the center pin of the vision system of the present invention;

FIG. 25 illustrates a top view of the center pin of the vision system of the present invention;

FIG. 26 illustrates a side view of the center pin of the vision system of the present invention;

FIG. 27 illustrates a cross-sectional view of the center pin of the vision system of the present invention;

FIG. 28 illustrates a detail view of a portion of the center pin of the vision system of the present invention;

FIG. 29 illustrates a perspective view of the side pin of the vision system of the present invention;

FIG. 30 illustrates a top view of the side pin of the vision system of the present invention;

FIG. 31 illustrates a side view of the side pin of the vision system of the present invention;

FIG. 32 illustrates a cross-sectional view of the side pin of the vision system of the present invention;

FIG. 33 illustrates a detail view of a portion of the side pin of the vision system of the present invention;

FIG. 34 illustrates a perspective view of the top member of the vision system of the present invention;

FIG. 35 illustrates a top view of the top member of the vision system of the present invention;

FIG. 36 illustrates a bottom view of the top member of the vision system of the present invention;

FIG. 37 illustrates a sectional view of the top member of the vision system of the present invention;

FIG. 38 illustrates a sectional view of the top member of the vision system of the present invention;

FIG. 39 illustrates a portion of the vision system of the present invention;

FIG. 40 illustrates a perspective view of the vision system of the present invention;

FIG. 41 illustrates a front view of the vision system of the present invention;

FIG. 42 illustrates a portion of the vision system of the present invention;

FIG. 43 illustrates a perspective view of a Y-slider device of the vision system of the present invention;

FIG. 44 illustrates a top view of the Y-slider device of the vision system of the present invention;

FIG. 45 illustrates a detail view of the Y-slider of the vision system of the present invention;

FIG. 46 illustrates a front view of the Y-slider of the vision system of the present invention;

FIG. 47 illustrates a first side view of the Y-slider of the vision system of the present invention;

FIG. 48 illustrates a second side view of the Y-slider of the vision system of the present invention;

FIG. 49 illustrates a back view of the X-slider of the vision system of the present invention;

FIG. 50 illustrates another front view of the X-slider of the vision system of the present invention;

FIG. 51 illustrates a detail view of the X-slider of the vision system of the present invention;

FIG. 52 illustrates another detail view of the X-slider of the vision system of the present invention;

FIG. 53 illustrates a cross-sectional view of the X-slider of the vision system of the present invention.

DETAILED DESCRIPTION

Figure 11:
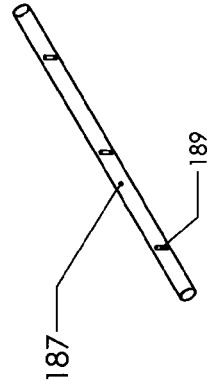
FIG. 11 illustrates a perspective view of the rail member of the vision system of the present invention.

The vision system of the present invention is used for locating a part or fixtured parts on a CMM (coordinate measuring machine) or a CNC (computer numeric control) Vision system. These machines are used for automatic dimensional measurement.

The Vision Slide ensures that the part which has been placed on the automatic dimensional measurement machine will not move by the use of the concentrated magnetic-field magnets that holds the part securely against both magnetic working faces, locating the part precisely on the machines staging surface. This established position establishes a starting point which can be reproduced or repeated. This starting point can be located anywhere on the table, depending on the optimal position desired for accommodating the part or parts to be measured. There is an adjustable slide scale in both the X and Y axis. By changing the position of the slide scales in either axis by the use of the side engagement pins the operator or programmer can choose several positions in either axis, such as, A through G in the Y-axis and 1 through 9 in the X-axis.

When a programmer writes a program, he will indicate in the instructions where to set these scales before loading the part to be inspected. The operator puts the slide scales in the proper position and then loads the part on the staging table against the magnetic/air suction or forceless material providing 1, 2 or 3 points of contact for the positioning of a fixture or part in its coincident plane and providing a stop location in its draw force or coincident locating plane and providing either the primary, secondary or tertiary planer stop.

All the operator has to do at this point is to start the program and the machine will locate the part. Even if someone wants to do a quick manual check without the use of a program, they can just place the part or fixture into the corner against the magnetic/air suction or forceless material providing 1, 2 or 3 points of contact for the positioning of a fixture or part in its coincident plane, providing a stop location in its draw force or coincident locating plane and providing either the primary, secondary or tertiary planer stop. The part is now secure and square, being held optimally for measurement.

The Vision Slide provides the necessary functions to make dimensional automated measurements accurately and efficiently with ease.

FIG. 1 illustrates the base member 100 of the vision system of the present invention. The vision system may include a first and second base member 100 where the first base member 100 may substantially mirror the second base member 100. The base member 100 may include a top base surface 101 which may be substantially planar and may include an upward extending mounting post 111 which may extend upwards from the top base surface 101 in order to cooperate with a rail member (not shown) and may include an inclined front surface 103 which may be at an angled relationship with respect to the top base surface 101. The inclined front surface 103 may include a longitudinal slot 135 which may extend along the longitudinal direction of the inclined front surface 103. The top base surface 101 may include mounting apertures 117 to mount the base member 100 by using a fastening device (not shown) such as a bolt, screw or other appropriate device. FIG. 1 additionally illustrates the back surface 107 of the base member 100 and illustrates a vertical surface 109 which may extend from the inclined front surface 103 to the top base surface 101. FIG. 1 additionally illustrates a first side surface 113 and a second side surface 115 which may extend from the top base surface 101 and the inclined front surface 103 to the bottom surface 105.

FIG. 2 illustrates the base member 100 which may include a top base surface 101 which may be substantially planar and may include an upward extending mounting post 111 which may extend upwards from the top base surface 101 in order to cooperate with a rail member (not shown) and may include an inclined front surface 103 which may be at an angled relationship with respect to the top base surface 101. The inclined front surface 103 may include a longitudinal slot 135 which may extend along the longitudinal direction of the inclined front surface 103. The top base surface 101 may include mounting apertures 117 to mount the base member 100 by using a fastening device (not shown) such as a bolt, screw or other appropriate device. FIG. 2 additionally illustrates the back surface 107 of the base member 100 and illustrates a vertical surface 109 which may extend from the inclined front surface 103 to the top base surface 101. FIG. 2 additionally illustrates a first side surface 113 and a second side surface 115 which may extend from the top base surface 101 and the inclined front surface 103 to the bottom surface 105.

FIG. 3 illustrates the top base surface 101 which may be substantially planar and may include an upward extending mounting post 111 which may extend upwards from the top base surface 101 in order to cooperate with a rail member (not shown) and may include an inclined front surface 103 which may be at an angled relationship with respect to the top base surface 101. FIG. 3 additionally illustrates the back surface 107 of the base member 100 and illustrates a vertical surface 109 which may extend from the inclined front surface 103 to the top base surface 101. FIG. 3 additionally illustrates the second side surface 115 which may extend from the top base surface 101 and the inclined front surface 103 to the bottom surface 105.

FIG. 4 illustrates a tower member 136 which may include a substantially planar first side tower surface 159 and a opposing substantially planar second side tower surface 159. FIG. 4 illustrates that a top tower surface 137 which may be between the first and second side tower surface is 159 may be connected to a vertical upper front tower surface 133 which may be connected to a substantially horizontal tower surface 131 which may be connected to a inclined front tower surface 119. The inclined front tower surface 119 cooperates with the inclined front surface 103 of the base member 100. The inclined tower surface 119 is connected to the lower vertical front tower surface 157 which may be connected to the bottom tower surface 155. The top tower surface 137 may be connected to the vertical upper back surface 139 which may be connected to the inclined back tower surface 151. The inclined back tower surface 151 may be connected to the lower vertical back surface 153 which may be connected to the bottom tower surface 155.

FIG. 5 illustrates a tower member 136 which may include a substantially planar first side tower surface 159 and a opposing substantially planar second side tower surface 159. FIG. 5 illustrates that a top tower surface 137 which may be between the first and second side tower surface is 159 may be connected to a vertical upper front tower surface 133 which may be connected to a substantially horizontal tower surface 131 which may be connected to a inclined front tower surface 119. The inclined front tower surface 119 cooperates with the inclined front surface 103 of the base member 100. The inclined tower surface 119 is connected to the lower vertical front tower surface 157 which may be connected to the bottom tower surface 155. The top tower surface 137 may be connected to the vertical upper back surface 139 which may be connected to the inclined back tower surface 151. The inclined back tower surface 151 may be connected to the lower vertical back surface 153 which may be connected to the bottom tower surface 155.

FIG. 5 additionally illustrates a first tower aperture 161 and a second tower aperture 163 which may extend through the tower member 136 to cooperate with fastening devices (not shown).

FIG. 6 illustrates a slider member 171 to cooperate with the tower member 136, and the slider member 171 may include a substantially planar top slider surface 173 which may be connected to a front slider surface 177 and may be connected to a back slider surface 179. The front slider surface 177 and the back slider surface 179 may be connected to a bottom slider surface 175 and may be connected to a side slider surface 181 which may include a first vertical portion 181a, a curved portion 181b, a horizontal portion 181c and a second vertical portion 181d. FIG. 6 additionally illustrates a channel 183 formed in the bottom slider surface 175 to cooperate with the bearing member 185 and a rail member 187 (not shown)

FIG. 7 illustrates a slider member 171 to cooperate with the tower member 136, and the slider member 171 may include a substantially planar top slider surface 173 which may be connected to a front slider surface 177 and may be connected to a back slider surface 179. The front slider surface 177 and the back slider surface 179 may be connected to a bottom slider surface 175 and may be connected to a side slider surface 181 which may include a first vertical portion 181a, a curved portion 181b, a horizontal portion 181c and a second vertical portion 181d.

FIG. 8 illustrates the top slider surface 173 which may include apertures 174.

Figure 10:
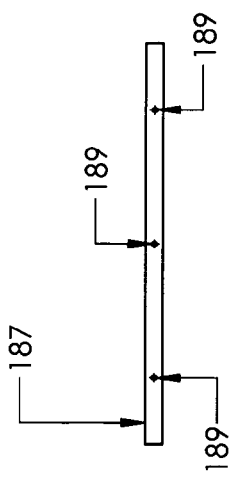
FIG. 10 illustrates a cross-sectional view of the rail member of the vision system of the present invention.

FIG. 10 illustrates a cross-sectional view of the rail member 187 which may be substantially solid and may include apertures 189 to cooperate with mounting post 111 in order to mount the rail member 1871 the longitudinal base member 100. The rail member 187 may be a longitudinal cylinder or other suitable shape.

FIG. 11 illustrates a perspective view of the rail member 187 which may be substantially solid and may include apertures 189 to cooperate with mounting post 111 in order to mount the rail member 187 with the longitudinal base member 100. The rail member 187 may be a longitudinal cylinder or other suitable shape.

Figure 9:
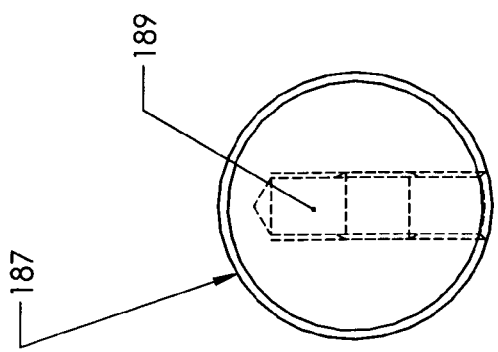
FIG. 9 illustrates a cross-section of the rail member of the vision system of the present invention.

FIG. 9 illustrates a cross-sectional view of the rail member 187 and illustrates the aperture 189.

Figure 12:
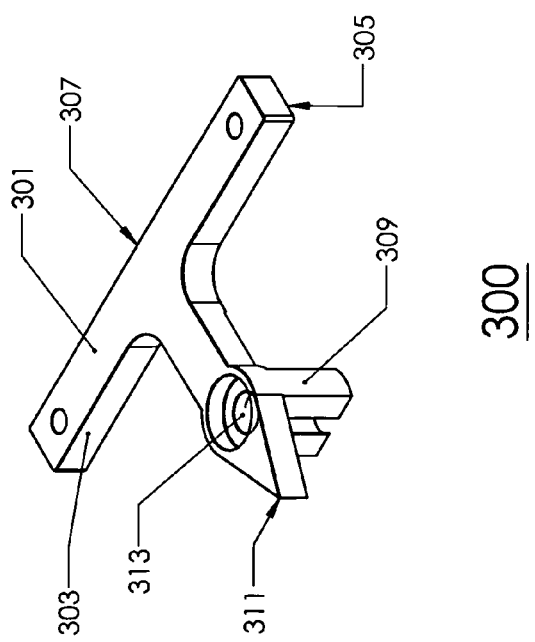
FIG. 12 illustrates a perspective view of the pointer member of the vision system of the present invention.

FIG. 12 illustrates a perspective view of the pointer member 300 which may include a mounting section 307 to mount the pointer member 300, a guide section 309 to guide the pointer member 300 and a pointer section 311 to point in a predetermined direction. The pointer member 300 may include a top pointer surface 301 which may be connected to a side pointer surface 303 which may be connected to a bottom pointer surface 305. The pointer section 311 may include an aperture 313 to cooperate with a locking fastener (not shown).

Figure 13:
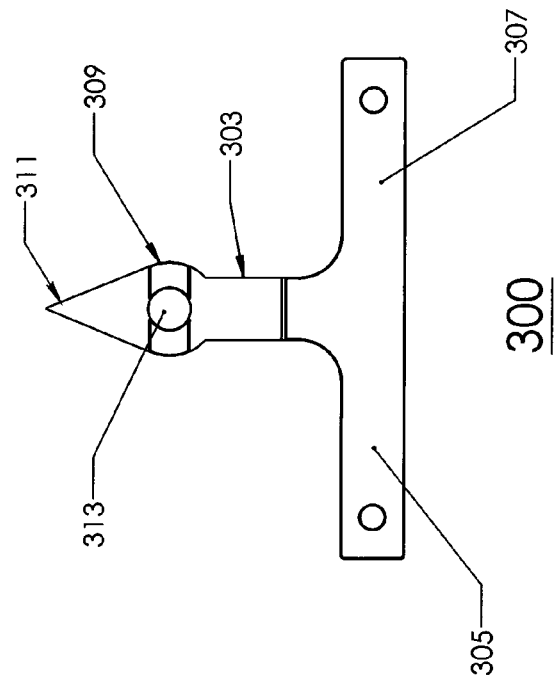
FIG. 13 illustrates a bottom view of the pointer member of the vision system of the present invention.

FIG. 13 illustrates a bottom view of the pointer member 300 which may include a mounting section 307 to mount the pointer member 300, a guide section 309 to guide the pointer member 300 and a pointer section 311 to point in a predetermined direction. The pointer member 300 may include a top pointer surface 301 which may be connected to a side pointer surface 303 which may be connected to a bottom pointer surface 305. The pointer section 311 may include an aperture 313 to cooperate with a locking fastener (not shown).

FIG. 14 illustrates a section view of the pointer member 300 which may include a mounting section 307 to mount the pointer member 300, a guide section 309 to guide the pointer member 300 and a pointer section 311 to point in a predetermined direction. The pointer member 300 may include a top pointer surface 301 which may be connected to a side pointer surface 303 which may be connected to a bottom pointer surface 305. The pointer section 311 may include an aperture 313 to cooperate with a locking fastener (not shown).

FIG. 15 illustrates a cross-sectional view of the pointer member 300 which may include a mounting section 307 to mount the pointer member 300, a guide section 309 to guide the pointer member 300 and a pointer section 311 to point in a predetermined direction. The pointer member 300 may include a top pointer surface 301 which may be connected to a side pointer surface 303 which may be connected to a bottom pointer surface 305. The pointer section 311 may include an aperture 313 to cooperate with a locking fastener (not shown).

Figure 16:
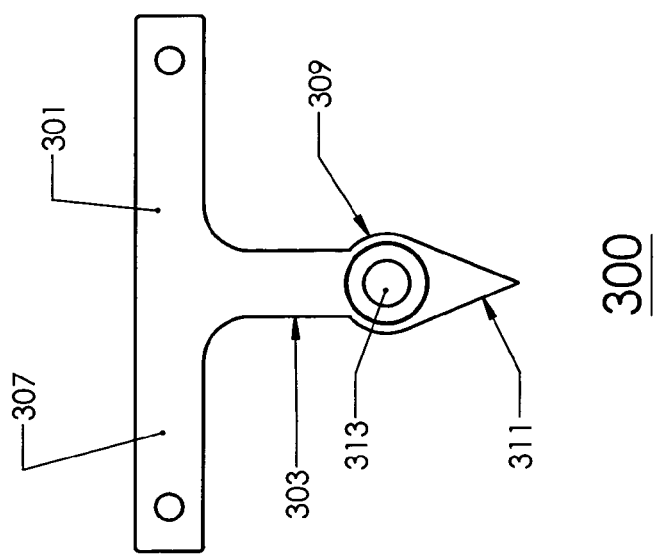
FIG. 16 illustrates a top view of the pointer member of the vision system of the present invention.

FIG. 16 illustrates a top view of the pointer member 300 which may include a mounting section 307 to mount the pointer member 300, a guide section 309 to guide the pointer member 300 and a pointer section 311 to point in a predetermined direction. The pointer member 300 may include a top pointer surface 301 which may be connected to a side pointer surface 303 which may be connected to a bottom pointer surface 305. The pointer section 311 may include an aperture 313 to cooperate with a locking fastener (not shown).

FIG. 17 illustrates a cross-sectional view of the pointer member 300 which may include a mounting section 307 to mount the pointer member 300, a guide section 309 to guide the pointer member 300 and a pointer section 311 to point in a predetermined direction. The pointer member 300 may include a top pointer surface 301 which may be connected to a side pointer surface 303 which may be connected to a bottom pointer surface 305. The pointer section 311 may include an aperture 313 to cooperate with a locking fastener (not shown).

FIG. 22 illustrates a perspective view of the transverse member 400 of the vision system of the present invention, and the transverse member 400 may slide ably between a first and second longitudinal base member 100 which may be mirror base members. The transverse member 400 moves/slides in the longitudinal direction of the longitudinal base member 100 and the traverse member 400 may be positionally locked and unlocked to the longitudinal base member 100.

FIG. 22 illustrates a top surface 403 which may include a slot 407 to cooperate with the guide section 309 of the pointer member 300 and may be connected to a first side surface 405 which may include aperture 401. The slot 407 may extend in the longitudinal direction of the traverse member 400. Additionally, the top surface 403 may be connected to a second side surface 410 and connected to an end surface 411. The top surface 403 may be in a spaced relationship with opposing bottom surface 409 which may be connected to the first side surface 405, the second side surface 410 and the end surface 411.

FIG. 18 illustrates a top surface 403 which may include a slot 407 to cooperate with the guide section 309 of the pointer member 300 and may be connected to a first side surface 405 which may include aperture 401. The slot 407 may extend in the longitudinal direction of the traverse member 400. Additionally, the top surface 403 may be connected to a second side surface 410 and connected to an end surface 411. The top surface 403 may be in a spaced relationship with opposing bottom surface 409 which may be connected to the first side surface 405, the second side surface 410 and the end surface 411.

FIG. 19 illustrates a top surface 403 which may include a slot 407 to cooperate with the guide section 309 of the pointer member 300 and may be connected to a first side surface 405 which may include aperture 401. The slot 407 may extend in the longitudinal direction of the traverse member 400. Additionally, the top surface 403 may be connected to a second side surface 410 and connected to an end surface 411. The top surface 403 may be in a spaced relationship with opposing bottom surface 409 which may be connected to the first side surface 405, the second side surface 410 and the end surface 411.

FIG. 20 illustrates a top surface 403 which may include a slot 407 to cooperate with the guide section 309 of the pointer member 300 and may be connected to a first side surface 405 which may include aperture 401. The slot 407 may extend in the longitudinal direction of the traverse member 400. Additionally, the top surface 403 may be connected to a second side surface 410 and connected to an end surface 411. The top surface 403 may be in a spaced relationship with opposing bottom surface 409 which may be connected to the first side surface 405, the second side surface 410 and the end surface 411.

FIG. 21 illustrates a top surface 403 which may include a slot 407 to cooperate with the guide section 309 of the pointer member 300 and may be connected to a first side surface 405 which may include aperture 401. The slot 407 may extend in the longitudinal direction of the traverse member 400. Additionally, the top surface 403 may be connected to a second side surface 410 and connected to an end surface 411. The top surface 403 may be in a spaced relationship with opposing bottom surface 409 which may be connected to the first side surface 405, the second side surface 410 and the end surface 411.

FIG. 23 illustrates an end view of the end surface 411.

FIG. 24 illustrates a perspective view of the center pin 500 which may include a head 501 which may be connected to a shaft 503 which may have a traverse aperture 505.

FIG. 25 illustrates a top view of the center pin 500 and illustrates the head 501.

FIG. 26 illustrates a side view of the center pin 500 and illustrates the head 501, the shaft 503 and the traverse aperture 505.

FIG. 27 illustrates a cross-sectional view of the center pin 500 and illustrates the head 501, the shaft 503 and a portion of the traverse aperture 505.

FIG. 28 illustrates a portion of the head 501.

FIG. 29 illustrates the side pin 550 which may include a head 551, a shaft 553 and a traverse aperture 555.

FIG. 30 illustrates the top surface of the head 551 of the side pin 550.

FIG. 31 illustrates the head of 551, the shaft 553 and the traverse aperture 555 of the side pin 550.

FIG. 32 illustrates a cross section of the side pin 550 which may include the head 551, the shaft 553 and a portion of the traverse aperture 555.

FIG. 34 illustrates the top member 600 and illustrates the top surface 601, the bottom surface 603, the front surface 605, the back surface 607 and the side surface 609. The top surface 601 may be opposed to the bottom surface 603 and connected to opposing side surfaces 609. The front and back surface 605, 607 connect the top surface 601 to the bottom surface 603. The top surface 601 may include top aperture 611 and the bottom surface 603 may include a bottom aperture 613.

FIG. 35 illustrates the top member 600 and illustrates the top surface 601, the bottom surface 603, the front surface 605, the back surface 607 and the side surface 609.

FIG. 36 illustrates the top member 600 and illustrates the top surface 601, the bottom surface 603, the front surface 605, the back surface 607 and the side surface 609.

FIG. 37 illustrates the top member 600 and illustrates the top surface 601, the bottom surface 603, the front surface 605, the back surface 607 and the side surface 609.

FIG. 38 illustrates the top member 600 and illustrates the top surface 601, the bottom surface 603, the front surface 605, the back surface 607 and the side surface 609.

FIG. 39 illustrates the center pin 500 which cooperates with the pointer member 300 which may be mounted on an x-slider 4901.

FIG. 40 illustrates the vision system which may include the pointer member 300, the center pin 500 which may be detachably connect the pointer member 300 to the x-slider 4901. FIG. 40 illustrates the traverse member 400 which may be detachably connected between an opposing pair of longitudinal base member 100 by a side pin 550. The vision system may include a tower member 136 and a top member 600 which may move/travel along a rail member 187.

FIG. 41 illustrates the vision system which may include the pointer member 300, the center pin 500 which may be detachably connect the pointer member 300 to the x-slider 4901. FIG. 41 illustrates the traverse member 400 which may be detachably connected between an opposing pair of longitudinal base member 100 by a side pin 550. The vision system may include a tower member 136 and a top member 600 which may move/travel along a rail member 187.

FIG. 42 illustrates the rail member 187 the side pin 550, the top member 600, the tower member 136 and the slider member 171.

FIG. 43 illustrates a perspective view of a Y-slider device 4301 of the vision system of the present invention and illustrates a bore 4303 to accommodate a magnet 4305 in order to hold a work piece (not shown) in the substantial Y direction.

FIG. 44 illustrates a top view of the Y-slider device of the vision system of the present invention and illustrates a section 4307.

FIG. 45 illustrates a sectional view of the Y-slider of the vision system of the present invention of the Y-slider device 4301. FIG. 45 illustrates a notch and illustrates a notch 4311 for a backlight to shine through.

FIG. 46 illustrates a front view of the Y-slider of the vision system of the present invention and illustrates the bore 4303;

FIG. 47 illustrates a first side view of the Y-slider of the vision system of the present invention and illustrates a journal a threaded aperture 4315 for attachment to the X-slider and illustrates a dowel aperture 4313 for attachment to the X-slider.

FIG. 48 illustrates a second side view of the Y-slider of the vision system of the present invention.

FIG. 49 illustrates a front view of the X-slider 4901 of the vision system of the present invention and illustrates a notch 4903, a mounting device 4905 such as a screw, a dowel for connection to the Y-slider and a bore 4909 for a magnet 4305 to attach to the work piece;

FIG. 50 illustrates another front view of the X-slider of the vision system of the present invention and illustrates section 4911.

FIG. 51 illustrates a sectional view of the X-slider 4901 of the vision system of the present invention and illustrates a notch 4913 for backlight to shine through.

FIG. 52 illustrates another sectional view of the X-slider of the vision system of the present invention and illustrates mounting apertures 4915 to mount the X-slider 4901.

FIG. 53 illustrates a cross-sectional view of the X-slider 4901 of the vision system of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A vision apparatus comprising:
a first longitudinal base member;
a second longitudinal base member which substantially mirrors the first longitudinal base member;
a traverse member to connect the first and second longitudinal base member;
a pointer member being positioned on the traverse member;
connecting members to connect the longitudinal base members and the traverse member; and
the longitudinal base member includes a inclined tower surface.

2. A vision apparatus comprising:
a first longitudinal base member;
a second longitudinal base member which substantially mirrors the first longitudinal base member;
a traverse member to connect the first and second longitudinal base member;
a pointer member being positioned on the traverse member;
connecting members to connect the longitudinal base members and the traverse member;
the longitudinal base member includes a mounting post;
the mounting post cooperates with a rail; and
the first longitudinal base member includes a connecting member to cooperate with the rail member.

* * * * *